United States Patent [19]

Pikus

[11] Patent Number: 5,497,562
[45] Date of Patent: Mar. 12, 1996

[54] RADIANT HEATER SYSTEM FOR SOLID PHASE CRYSTALLIZATION AND POLYMERIZATION OF POLYMERS

[75] Inventor: Ilya Pikus, Plymouth, Minn.

[73] Assignee: Hosokawa Bepex Corporation, Minneapolis, Minn.

[21] Appl. No.: 398,065

[22] Filed: Mar. 3, 1995

[51] Int. Cl.$^6$ .................................. F26B 3/34; C08J 3/28
[52] U.S. Cl. .................... 34/269; 528/502; 528/503; 526/59; 526/61; 526/64; 526/319; 522/3; 522/4; 522/165; 34/266; 34/267; 34/443; 34/549
[58] Field of Search .................. 528/502, 503; 526/59, 61, 64, 319; 522/3, 4, 165; 34/266, 267, 269, 443, 549

[56] References Cited

U.S. PATENT DOCUMENTS

| | | | |
|---|---|---|---|
| 3,014,011 | 12/1961 | Zoetbrook | 528/498 |
| 4,056,391 | 11/1977 | Turner et al. | 96/1 |
| 5,090,134 | 2/1982 | Russemeyer | 34/589 |
| 5,093,456 | 3/1992 | Mitra et al. | 528/73 |
| 5,212,015 | 5/1993 | Mitra et al. | 428/412 |
| 5,442,089 | 8/1995 | Mitra et al. | 560/20 |

OTHER PUBLICATIONS

Bepex Corporation (predecessor of Hosokawa Bepex Corporation) brochure: Process Equipment for the Food Industry–literature illustrating solidaire and Torusdisc equipment.
Research Inc. literature illustrating Model 5208 heater.

*Primary Examiner*—Samuel A. Acquah
*Attorney, Agent, or Firm*—James P. Ryther

[57] ABSTRACT

A system for the solid phase polymerization of polymers comprising a crystallizer, and wherein cold amorphous polymer is introduced to the crystallizer. A source of infrared radiation is associated with the crystallizer, and the polymer is heated by applying infrared radiation thereto. The degree of heating is controlled so that the polymer reaches the crystallization or polymerization temperature without exceeding the polymer melting point.

6 Claims, 2 Drawing Sheets

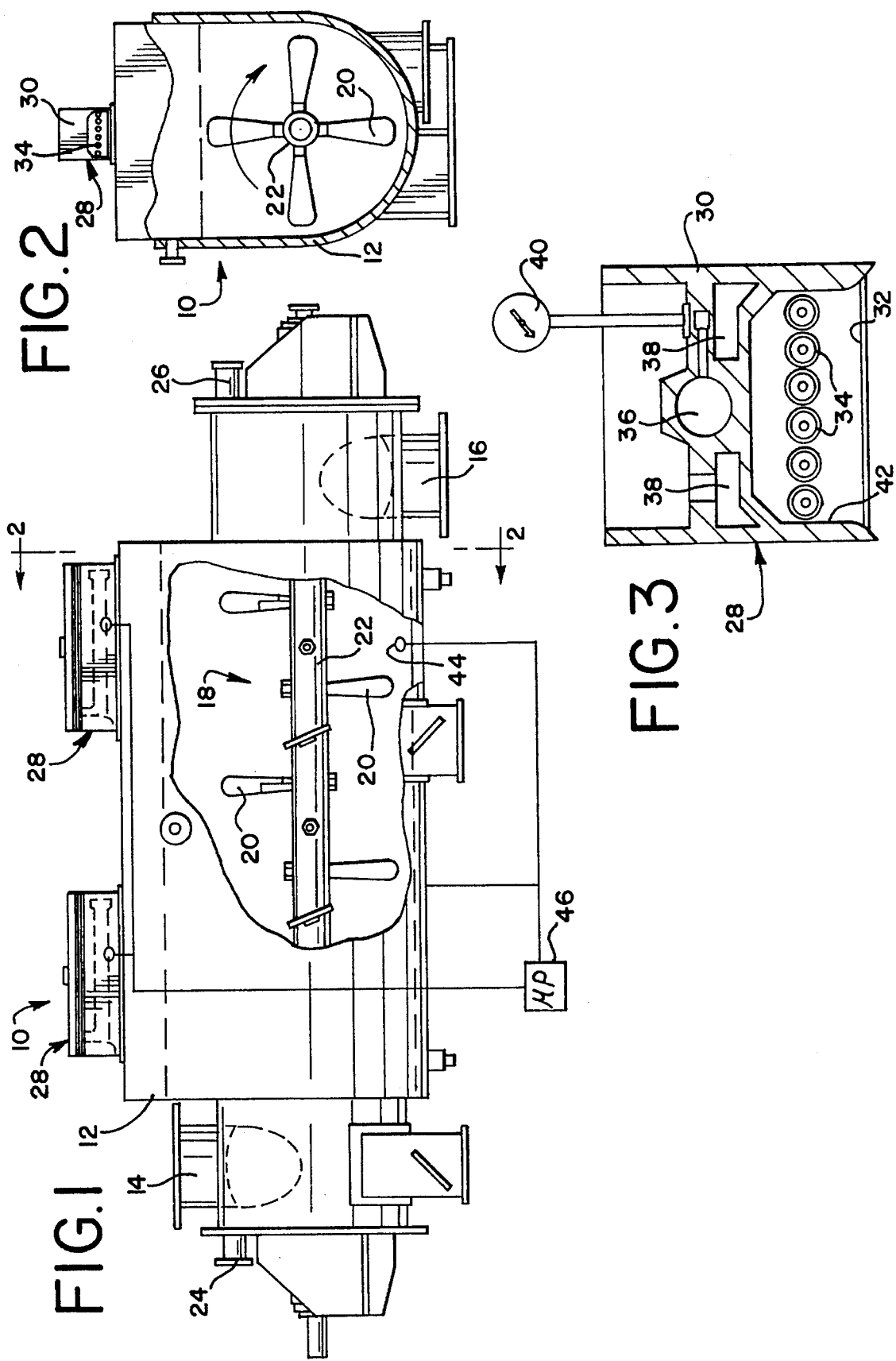

RADIANT HEATER SYSTEM FOR SOLID PHASE CRYSTALLIZATION AND POLYMERIZATION OF POLYMERS

BACKGROUND OF THE INVENTION

This invention relates to a method and apparatus for the solid phase crystallization and polymerization of polymers. The invention relates more particularly to a unique system for heating the polymers in the solid state to achieve the desired reactions.

Prior art systems of the general type involve feeding of cold amorphous granular polymer material to a crystallizer and, after substantial heat input, discharging of hot crystallized product. A particular apparatus for achieving the crystallization may comprise an indirect heat supply unit or a fluid bed. The SOLIDAIRE® or TORUSDISC® equipment manufactured by Hosokawa Bepex Corporation of Minneapolis, Minn. are examples of indirect heat supply units which may be utilized for achieving the solid phase crystallization and/or polymerization. In such systems, steam or other heated fluid is passed through rotors and/or jackets which are in contact with the vigorously agitated granular polymer material. Due to the contact with these hot surfaces, the polymer is heated to the necessary temperature for achieving the crystallization and polymerization reactions.

In a fluid bed system, for example units manufactured by Hosokawa Bepex, heated air is brought into contact with the polymer material. In order to improve heat transfer and to achieve the temperatures required for the crystallization reaction, indirect heating elements in the form of tube bundles or plate coils may be immersed in the fluidized material.

Although processing of polymers in accordance with prior art systems can be successfully achieved, there have been persistent problems associated with stickiness of polymer chips which exhibit adhesive characteristics during the solid phase crystallization and polymerization. This has been a long-recognized difficulty as discussed in U.S. Pat. No. 3,014,011, and a proposed improvement has been discussed more recently in U.S. Pat. No. 5,090,134. In the latter case, the prevention of agglomeration and caking is specifically discussed.

SUMMARY OF THE INVENTION

The system of this invention comprises a process and apparatus uniquely suitable for achieving solid phase crystallization and polymerization of cold amorphous granular polymer, for example, the treatment of chips of polyethylene terephthalate. In the process of the invention, the chips are introduced to a crystallizer equipped with a source of infrared radiation. The chips are heated by means of the radiation, and the degree of heating is controlled to insure that the product is raised to a temperature sufficiently high to achieve crystallization and/or polymerization while not exceeding the melt temperature of the polymer.

A system of the type contemplated is especially suited for precise control by means of a microprocessor or computer. This is especially the case where the apparatus of the invention comprises a continuously operating unit with means for introducing the amorphous granular polymer through an inlet and means for discharging the crystallized polymer through an outlet spaced from the inlet. A plurality of spaced-apart sources of infrared radiation are associated with the unit and these sources can be individually controlled to provide optimum efficiency in the operation.

BRIEF DESCRIPTION OF THE DRAWINGS

FIG. 1 is a side elevational view, partly cut away, of a polymer processing unit characterized by the features of this invention;

FIG. 2 is an end elevational view of the unit shown in FIG. 1;

FIG. 3 is a vertical sectional view of an infrared radiation heater used in connection with the invention;

DETAILED DESCRIPTION OF THE INVENTION

Figure 4:
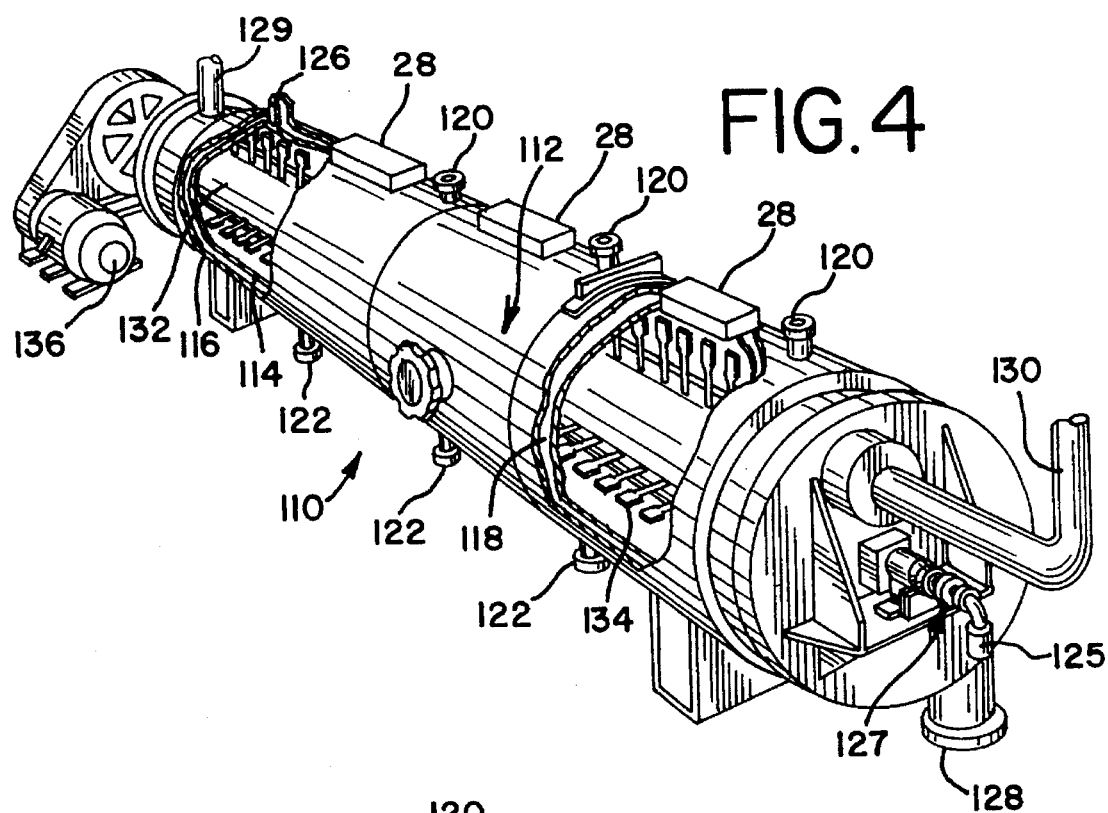
FIG. 4 is a perspective view of an alternative form of unit adapted to be employed in the practice of the invention; and, FIG. 5 is a vertical, sectional view of the unit shown in FIG. 4.

The drawings illustrate polymer processing units adapted for practicing the method of the invention. In FIGS. 1 and 2, the unit 10 consists of an elongated housing 12 having an inlet 14 for receiving cold amorphous granular polymer and an outlet 16 for discharge of crystallized polymer.

An agitator 18 is provided for rotation within the housing 12. This structure includes a plurality of paddles 20 which extend outwardly from the periphery of the agitator shaft 22. In accordance with known practice, the paddles are set at an angle whereby rotation of the agitator operates to continuously move polymer from the inlet end of the unit toward the outlet end. The residence time of the polymer is controlled by controlling the rotor speed and adjusting the paddle attitudes in accordance with known practice. The unit is also conventionally provided with gas transmission pipes 24 and 26 at its opposite ends so that heated air or the like may be introduced for movement within the housing cocurrently or countercurrently relative to the polymer movement.

The unit 10 is also provided with spaced-apart infrared radiant heaters 28. The particular heaters shown are of a type manufactured by Research Inc., Model 5208, however, it will be understood that various types of infrared radiant heaters could be utilized in the practice of the invention. It has been found that the infrared spectrum is well suited for thermoprocessing of polymer materials undergoing different morphological modifications in the course of crystallization and/or polymerization.

The heaters 28 shown each consist of a housing 30 having a clear quartz window 32 supported at its bottom side. Positioned above the window are a plurality of infrared radiant heat lamps 34. Passages 36 and 38 are provided for air and water cooling of the heaters. Gauge 40 is provided for monitoring the temperature conditions to insure proper heater operation. The interior surface 42 of the heater serves as a reflector whereby heat generated by the lamps 34 will pass through window 32.

In the practice of this invention, openings are defined in the top wall of housing 12, and a heater 28 is mounted over each opening so that the window of a heater is exposed within the housing. The polymer within the housing is, therefore, exposed to the heat generated by a heater.

FIG. 4 illustrates an alternative form of polymer processing unit which may be used in the practice of the invention. This apparatus 110 is of the general type described in U.S. Pat. No. 5,271,163, and includes an elongated housing 112. This housing defines an inner wall 114 and an outer wall 116 whereby passages 118 are defined between the vessel walls. Thus, the outer wall 116 constitutes a spaced-apart jacket for the inner wall 114.

Inlet fittings 120 are associated with the outer jacket whereby steam or other media may be introduced into the passages 118 defined between the inner and outer walls. Outlet fittings 122 are provided whereby condensate or other media may be removed and whereby constant circulation around the inner wall of the vessel can be achieved.

Material is introduced to the vessel 112 through inlet 126 and a material outlet 128 is provided at the opposite end of the vessel. If desired, heated gas may be introduced with the material for circulation through the vessel. Under such circumstances, the gas may be introduced through inlet 126 or a separate inlet 129, and a discharge pipe 130 for vapor discharge is provided. This arrangement will result in gases flowing across the vessel cocurrent with the material.

Alternatively, the pipe 130 may be employed for the introduction of gases which will move countercurrent to the material, and the separate pipe 129 may be employed for vapor discharge or this discharge may occur through inlet 126. This arrangement results in "countercurrent" flow.

An agitator consisting of tubular rotor 132 and rows of paddles 134 is mounted for rotation within the vessel 112, and motor 136 is employed for driving the rotor. As explained in the aforementioned patent, the paddles extend outwardly from the rotor surface which is adjacent the axis of rotation of the rotor. The paddles extend to a point closely adjacent the inner surface of inner wall 114 whereby the paddles will serve to propel material from the inlet of the vessel along the length of the vessel and to the outlet of the vessel.

A plurality of infrared radiant heaters 28 are associated with the housing 112. As described with reference to FIGS. 1–3, these heaters are used to supply the heat necessary for achieving recrystallization when polymer is processed in the apparatus.

Figure 5:
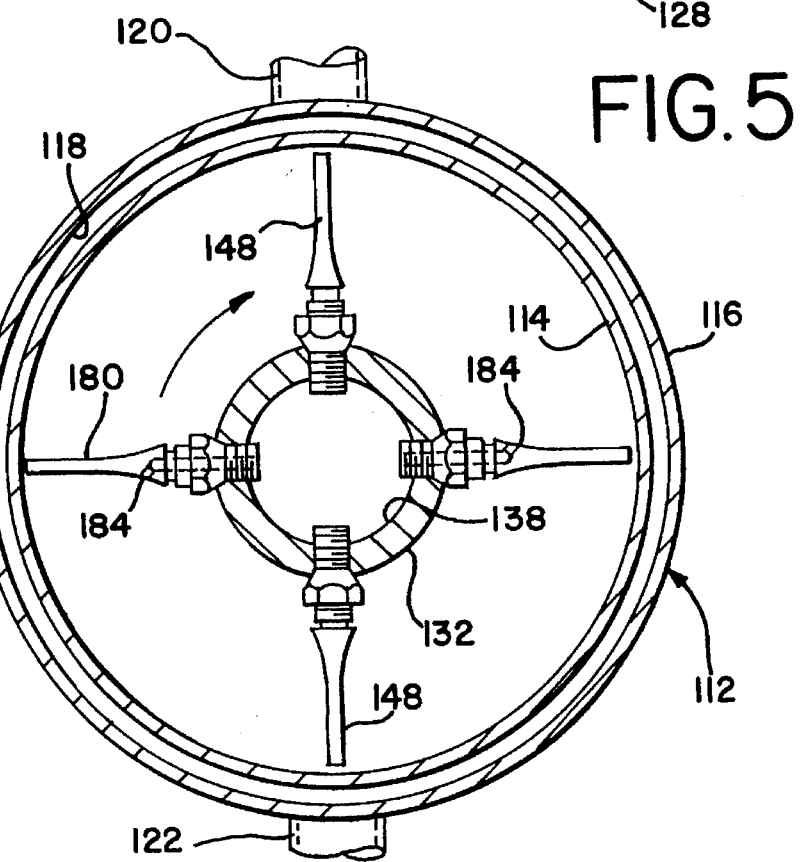

FIG. 5 illustrates a particular paddle configuration shown in U.S. Pat. No. 5,271,163 and this is an example of a configuration particularly useful in a system which utilizes infrared radiation heating. As described in that patent, the rotor 132 supporting the paddles 148 and 180 defines an interior passage 138, and air is adapted to be delivered into this passage. The interiors of the paddles 180 define passages 184 communicating with passage 138, and the passages 184 open into the interior of vessel 112.

Gas is adapted to be delivered to the rotor 132 for passage outwardly through the nozzles 184. As shown in FIG. 4, the gas may comprise air supplied to the rotor through pipe 125 leading to rotary joint 127.

The system of the invention has certain distinct advantages over prior art arrangements. By relying primarily on radiant heating rather than on conductive or convective heating, dependence on an intervening medium such as heated air to achieve a desired temperature is avoided. Due to direct heat transfer to the particles by means of radiant energy, the polymer temperature can be maintained efficiently at an optimal level. The heat transfer rate with infrared radiation is much higher than with a convective system (such as a fluid bed), or a conductive system (such as when relying on SOLIDAIRE® and TORUSDISC® systems of the type manufactured by Hosokawa Bepex Corporation; general reference to such systems is found in copending application Ser. No. 08/272,027 entitled "Process and Apparatus for Solid Phase Polymerization of Polymers"). With such higher heat transfer rates, more thermoprocessing can be accomplished in less space.

The infrared radiant heaters have low thermal mass (inertia) and can, therefore, respond almost instantaneously to modulating controls. Accordingly, the temperature of the polymer can be maintained precisely. This control may focus on a given temperature range throughout the unit so that the output of thermocouples such as shown at 44 in FIG. 1, or other temperature sensing means, may be used by means such as microprocessor 46 to reduce or elevate the output of the radiant heaters to maintain that range. Alternatively, the unit may be divided into zones with specific temperature ranges assigned to each zone. As indicated, thermocouples 44 may be associated with the respective zones, and radiant heaters adjacent the respective zones may then be independently controlled.

The aforementioned heaters of the type manufactured by Research Inc. are an example of heaters which lend themselves to such controlled operation. Thus, process control instrumentation and SCR power controllers have been designed specifically for use with such heaters. Processing units 10 and 110 illustrated in this application are of a type which have been in the past implemented with temperature sensing means and, therefore, the systems of this invention are readily adapted to programmable computer controlled operation.

The adaptability to controlled operation is particularly important in connection with polymers which are highly sensitive and/or susceptible to sticking problems. In this regard, it is known that the melt temperature of a given polymer will vary depending on the degree of crystallization and/or polymerization that has taken place in the course of the processing.

With the system of this invention, the polymer temperature in any given zone of the unit can be maintained close to, but not exceeding, the polymer melt or sintering temperature. Accordingly, maximum efficiency can be achieved from the standpoint of crystallization and/or polymerization while avoiding the problems associated with overheating. It will be appreciated in this regard that the drawings illustrate two or three infrared radiant heaters in association with a processing unit, however, the number and location of these heaters may be varied as the processing applications vary.

The quick response control for infrared radiant heaters is also advantageous if emergency conditions are encountered. Thus, the unit temperature will drop very quickly if the heaters are shut down whereas the prior art systems described, because of the characteristic high thermal mass, are very slow to respond.

When considering the nature of individual polymer particles being processed, another advantage of the system of this invention becomes apparent. With convective or conductive heat transfer conditions, the polymer particles absorb heat energy dependent on their surface area which causes a substantial temperature gradient within each individual particle and reduces the overall reaction rate. At any given material temperature set point, the particle surface becomes "overheated" followed by softening of the particle surface layer and, as a result, undesirable agglomeration occurs. Therefore, the prior art systems described employ relatively low crystallization and/or polymerization temperatures thereby restricting the reaction rates.

On the contrary, the radiant heater system of the present invention is very efficient in terms of providing reduced temperature gradients in the polymer granules and improved reaction rates. This is due to the ability of radiant energy, particularly in the infrared portion of the electromagnetic spectrum, to penetrate quickly beneath the surface of the polymer particles.

This phenomenon is of special importance during the solid phase crystallization when semi-transparent amorphous chips have very favorable optical properties. Thus, with infrared radiant energy, the crystallization and morphological transition of the polymer can quickly begin at the center of the particle thereby reducing appreciably the risk of "overheating" the particle surface and thereby reducing or eliminating the tendency of the particles to stick together at an elevated temperature.

With the radiation technique of this invention, the rate of crystallization and/or polymerization is significantly improved, and an improvement in the quality of the end product is realized. These improvements are in the form of optimal crystal size, nucleation and crystallization.

The above-described advantages can be realized using the radiant heaters as the sole heat source, however, as indicated particularly by the description of the processing unit 110, various means may be employed to supplement the heat supply. These may comprise the provision of heated fluids in the surrounding jacket 114, 116, and/or within the rotor 132, and/or through the paddles 180.

The paddles 180, or other paddle means such as those of the type described in U.S. Pat. No. 5,271,163, may also be used for different purposes when employed in combination with the radiant heaters. Specifically, injection of air through rotor 132 and outwardly through paddles 180 will serve to increase the agitation of the polymer bed. This can result in greater uniformity in the reactions taking place.

It will be understood that various changes and modifications may be made in the invention as described without departing from the spirit thereof, particularly as defined in the following claims.

That which is claimed is:

1. A process for the solid phase polymerization of polyester comprising the steps of providing a crystallizer, introducing cold amorphous polymer to the crystallizer providing a source of infrared radiation, heating said polymer by applying infrared radiation thereto, and controlling the degree of heating whereby said polymer reaches a crystallization temperature without exceeding the polymer melting point.

2. A process according to claim 1 wherein said crystallizer comprises a continuously operating unit having an inlet for said amorphous polymer and an outlet spaced away from said inlet for discharge of the crystallized polymer, and including the step of controlling the temperature of said polymer along the length of said unit.

3. A process according to claim 2 including the step of positioning a plurality of sources of infrared radiation along the length of said unit, and independently controlling the operation of the respective sources.

4. A process according to claim 1 wherein said crystallizer comprises a housing having heating means independent of said source of infrared radiation associated therewith, and including the step of utilizing said heating means to supplement the heat provided by said source of infrared radiation.

5. A process according to claim 1 wherein said crystallizer comprises a housing, a rotor supported by said housing, and paddles supported by said rotor, and including the steps of moving said polymer through said housing by rotating said rotor and engaging said polymer with said paddles, and agitating said polymer by means of said paddles.

6. A process according to claim 5 wherein said rotor and paddles define passages communicating with the interior of said housing, and including the step of introducing air into said passages for contact with said polymer for further agitation thereof.

* * * * *